(12) United States Patent
Nakajima et al.

(10) Patent No.: US 6,862,603 B1
(45) Date of Patent: Mar. 1, 2005

(54) FILE MANAGEMENT SYSTEM, FILE MANAGEMENT METHOD, AND STORAGE MEDIUM

(75) Inventors: Satoru Nakajima, Kawasaki (JP); Kamon Hasuo, Kawasaki (JP); Masashi Yahara, Yokohama (JP); Ryuichi Masuda, Tokyo (JP); Tsutomu Murayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/387,567

(22) Filed: Sep. 1, 1999

(30) Foreign Application Priority Data

Sep. 4, 1998 (JP) ............................................. 10-267348
Sep. 4, 1998 (JP) ............................................. 10-267349

(51) Int. Cl.$^7$ ............................................. G06F 12/00
(52) U.S. Cl. ..................... 707/200; 707/205; 707/104.1
(58) Field of Search ............................ 707/1–10, 104.1, 707/200, 530

(56) References Cited

U.S. PATENT DOCUMENTS

| | | | | |
|---|---|---|---|---|
| 5,359,512 A | * | 10/1994 | Nishihara | .................... 382/128 |
| 5,363,504 A | * | 11/1994 | Hasuo | ...................... 707/104.1 |
| 5,742,808 A | | 4/1998 | Hasuo | ........................ 395/601 |
| 5,761,655 A | * | 6/1998 | Hoffman | ........................ 707/4 |
| 5,895,455 A | * | 4/1999 | Bellinger et al. | ............ 715/908 |
| 5,905,580 A | * | 5/1999 | Cok et al. | .................... 358/302 |
| 6,088,124 A | * | 7/2000 | Tanaka | ........................ 382/161 |
| 6,138,149 A | * | 10/2000 | Ohmura | ........................ 707/10 |
| 6,154,755 A | * | 11/2000 | Dellert et al. | ............. 707/104.1 |
| 6,192,165 B1 | * | 2/2001 | Irons | ........................ 707/104.1 |
| 6,269,379 B1 | * | 7/2001 | Hiyama et al. | ........... 707/104.1 |
| 6,301,586 B1 | * | 10/2001 | Yang et al. | ............... 707/104.1 |
| 6,304,335 B1 | * | 10/2001 | Furuya et al. | |
| 6,334,025 B1 | * | 12/2001 | Yamagami | .................... 386/96 |
| 6,609,135 B1 | * | 8/2003 | Omori et al. | ............. 707/104.1 |

* cited by examiner

*Primary Examiner*—Jean M. Corrielus
*Assistant Examiner*—Anh Ly
(74) *Attorney, Agent, or Firm*—Fitzpatrick, Cella, Harper & Scinto

(57) ABSTRACT

A file management system, a file management method, and a storage medium by which a higher productivity is achieved by efficient document indexing. In copying index data, a copy is created from text data of an application such as a text editor or a spread sheet or from index data displayed on a document list of a document management system. A range for pasting index data is selected by a pointing device or keyboard operation. The selected range includes a record as a search result, a record in which a new document is recorded, and a pre-index record. If a user gives an instruction on pasting index data, the obtained index data is checked to be recordable data for a field of the selected cell. If it is recordable data, index data record processing is performed.

15 Claims, 23 Drawing Sheets

| Properties | No. | Title | Subject | Pages | Rank | Entry Date |
|---|---|---|---|---|---|---|
| ○ · · · · | 1 | Car | Double-sided,multi-page doc. | 31 | A | 98/05/21 |
| ○ · · · · | 2 | God | Large colour image | 12 | C | 98/05/21 |
| ○ · · · · | 3 | Monument | Simple colour bar chart | 11 | B | 98/05/21 |
| ○ · · · · | 4 | Object | Single-sided,multi-page doc. | 10 | A | 98/01/13 |
| ○ · · · · | 5 | People | Double-sided,multi-page doc. | 31 | A | 98/05/21 |
| ○ · · · · | 6 | Snow | Large colour image | 11 | C | 98/05/21 |
| ○ · · · · | 7 | Shop | Simple colour bar chart | 10 | B | 98/01/13 |
| ○ · · · · | 8 | | | 9 | | 98/05/21 |
| ○ · · · · | 9 | | | 15 | | 98/05/21 |
| ○ · · · · | 10 | | | 16 | | 98/05/21 |
| △ · · · · | 11 | | | 0 | | |
| △ · · · · | 12 | | | 0 | | |
| △ · · · · | 13 | | | 0 | | |
| △ · · · · | 14 | | | 0 | | |
| △ · · · · | 15 | | | 0 | | |
| △ · · · · | 16 | | | 0 | | |
| △ · · · · | 17 | | | 0 | | |
| △ · · · · | 18 | | | 0 | | |
| □ · · · · | * | | | 0 | | |

FIG. 3

| Properties | No. | Title | | Chapter | | Pages | Rank | Entry Date |
|---|---|---|---|---|---|---|---|---|
| ○ ... | 1 | menu spec | | 1-1 | | 23 | A | 98/06/24 |
| ○ ... | 2 | menu spec | | 1-2 | | 35 | B | 98/06/24 |
| ○ ... | 3 | menu spec | | 1-3 | | 12 | D | 98/06/24 |
| ○ ... | 4 | X-1 report | | 1 | | 50 | A | 98/06/24 |
| ○ ... | 5 | X-2 report | | 1 | | 45 | | 98/06/24 |
| ○ ... | 6 | | | | | 44 | | 98/06/24 |
| ○ ... | 7 | | | | | 16 | | 98/06/24 |
| ○ ... | 8 | | | | | 8 | | 98/06/24 |
| ○ ... | 9 | | | | | 9 | | 98/06/24 |
| ○ ... | 10 | | | | | 12 | | 98/06/24 |
| △ ... | 11 | menu spec | | 2-1 | | 0 | | |
| △ ... | 12 | menu spec | | 2-2 | | 0 | | |
| △ ... | 13 | menu spec | | 3-1 | | 0 | | |
| △ ... | 14 | installer spec | | | | 0 | | |
| △ ... | 15 | function spec | | | | 0 | | |
| □ ... | * | | | | | | | |

FIG. 4A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | menu spec | 1-2 | 35 | B | 98/06/26 |
| ○ · · · · | 3 | menu spec | 1-3 | 12 | D | 98/06/26 |
| ○ · · · · | 4 | function spec | 10 | 3 | C | 98/06/26 |
| ○ · · · · | 5 | function spec | 12 | 5 | | 98/06/26 |
| ○ · · · · | 6 | X-2 report | | 50 | | 98/06/26 |
| ○ · · · · | 7 | X-2 report | | 45 | | 98/06/26 |
| ○ · · · · | 8 | installer spec | 1 (all) | 32 | A | 98/06/26 |
| ○ · · · · | 9 | menu spec | 2-1 | 12 | B | 98/06/26 |
| ○ · · · · | 10 | menu spec | 2-2 | 14 | B | 98/06/26 |
| ○ · · · · | 11 | menu spec | 3-1 | 36 | A | 98/06/26 |
| ○ · · · · | 12 | X-1 report | | 50 | | 98/06/26 |
| ○ · · · · | 13 | X-1 report | | 50 | | 98/06/26 |
| ○ · · · · | 14 | function spec | 11 | 11 | C | 98/06/26 |
| △ · · · · | * | | | | | |

FIG. 4B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| □ · · · · | * | | | | | |

FIG. 5A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| □ · · · · | * | | | | | |
| | | | | | | |

FIG. 5B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | | | 10 | | 98/06/26 |
| ○ · · · · | 5 | | | 10 | | 98/06/26 |
| ○ · · · · | 6 | | | 5 | | 98/06/26 |
| △ · · · · | * | | | | | |

FIG. 6A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | ▼ | | 10 | | 98/06/26 |
| ○ · · · · | 5 | | | 10 | | 98/06/26 |
| ○ · · · · | 6 | | | 5 | | 98/06/26 |
| □ · · · · | * | | | | | |

FIG. 6B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B ▼ | 98/06/26 |
| △ · · · · | * | | | | | |

FIG. 7A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| □ · · · · | * | ▼ | | | | |

FIG. 7B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| △ · · · · | 7 | X-11 report | 1 | 0 | | |
| △ · · · · | 8 | X-11 report | 2 | 0 | | |
| △ · · · · | 9 | X-12 report | 1   ▼ | 0 | | |
| □ · · · · | * | | | | | |

FIG. 8A

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| △ · · · · | 7 | X-11 report | 1 | 0 | | 98/06/26 |
| △ · · · · | 8 | X-11 report | 2 | 0 | | |
| △ · · · · | 9 | X-12 report | 1 | 0 | | |
| □ · · · · | * | | | | | |

FIG. 8B

| Properties | No. | Title | Chapter | Pages | Rank | Entry Date |
|---|---|---|---|---|---|---|
| ○ · · · · | 1 | menu spec | 1-1 | 23 | A | 98/06/26 |
| ○ · · · · | 2 | installer spec | 1 (all) | 32 | A | 98/06/26 |
| ○ · · · · | 3 | menu spec | 3-1 | 36 | A | 98/06/26 |
| ○ · · · · | 4 | X-3 report | 1 | 10 | C | 98/06/26 |
| ○ · · · · | 5 | X-3 report | 2 | 10 | C | 98/06/26 |
| ○ · · · · | 6 | menu spec | 3-2 | 5 | B | 98/06/26 |
| ○ · · · · | 7 | X-11 report | 1 | 12 | | 98/06/26 |
| ○ · · · · | 8 | X-11 report | 2 | 8 | | 98/06/26 |
| ○ · · · · | 9 | X-12 report | 1 | 22 | | 98/06/26 |
| ○ · · · · | * | | | | | |

FIG. 9

|    | A            | B                           | C          |
|----|--------------|-----------------------------|------------|
| 1  | Title        | Subject                     | Date       |
| 2  | Car          | Double-sided,multi-page doc.| 1997/7/1   |
| 3  | God          | Large colour image          | 1997/9/30  |
| 4  | Monument     | Simple colour bar chart     | 1997/10/13 |
| 5  | Object       | Single-sided,multi-page doc.| 1997/10/13 |
| 6  | People       | Double-sided,multi-page doc.| 1997/12/25 |
| 7  | Snow         | Large colour image          | 1998/1/4   |
| 8  | Shop         | Simple colour bar chart     | 1997/3/8   |
| 9  | Amazon       | Double-sided,multi-page doc.| 1998/4/22  |
| 10 | Festival     | Large colour image          | 1998/5/28  |
| 11 | Colour Graph | Simple colour bar chart     | 1998/5/30  |
| 12 | Build        | Single-sided,multi-page doc.| 1998/6/26  |
| 13 |              |                             |            |
| 14 |              |                             |            |
| 15 |              |                             |            |
| 16 |              |                             |            |
| 17 |              |                             |            |
| 18 |              |                             |            |
| 19 |              |                             |            |
| 20 |              |                             |            |
| 21 |              |                             |            |
| 22 |              |                             |            |

FIG. 10

| | | |
|---|---|---|
| Car | Double-sided,multi-page doc. | 1997/7/1 |
| God | Large colour image | 1997/9/30 |
| Monument | Simple colour bar chart | 1997/10/13 |
| Object | Single-sided,multi-page doc. | 1997/10/13 |
| People | Double-sided,multi-page doc. | 1997/12/25 |
| Snow | Large colour image | 1998/1/4 |
| Shop | Simple colour bar chart | 1997/3/8 |
| Amazon | Double-sided,multi-page doc. | 1998/4/22 |
| Festival | Large colour image | 1998/5/28 |
| Colour Graph | Simple colour bar chart | 1998/5/30 |
| Build | Single-sided,multi-page doc. | 1998/6/26 |
| Car | Double-sided,multi-page doc. | 1997/7/1 |
| God | Large colour image | 1997/9/30 |
| Monument | Simple colour bar chart | 1997/10/13 |
| Object | Single-sided,multi-page doc. | 1997/10/13 |
| People | Double-sided,multi-page doc. | 1997/12/25 |
| Snow | Large colour image | 1998/1/4 |
| Shop | Simple colour bar chart | 1997/3/8 |
| Amazon | Double-sided,multi-page doc. | 1998/4/22 |
| Festival | Large colour image | 1998/5/28 |
| Colour Graph | Simple colour bar chart | 1998/5/30 |
| Build | Single-sided,multi-page doc. | 1998/6/26 |

FIG. 11

| Properties | No. | Title | Subject | Pages | Rank | Entry Date |
|---|---|---|---|---|---|---|
| ○···· | 1 | Car | Double-sided,multi-page doc. | 31 | A | 98/05/21 |
| ○···· | 2 | God | Large colour image | 12 | C | 98/05/21 |
| ○···· | 3 | Monument | Simple colour bar chart | 11 | B | 98/05/21 |
| ○···· | 4 | Object | Single-sided,multi-page doc. | 10 | A | 98/01/13 |
| ○···· | 5 | People | Double-sided,multi-page doc. | 31 | A | 98/05/21 |
| ○···· | 6 | Snow | Large colour image | 11 | C | 98/05/21 |
| ○···· | 7 | Shop | Simple colour bar chart | 10 | B | 98/01/13 |
| □···· | * | | | 0 | | |

FIG. 12

| Properties | No. | Title | Subject | Pages | Rank | Entry Date |
|---|---|---|---|---|---|---|
| ○···· | 1 | Car | Double-sided,multi-page doc. | 31 | A | 98/05/21 |
| ○···· | 2 | God | Large colour image | 12 | C | 98/05/21 |
| ○···· | 3 | Monument | Simple colour bar chart | 11 | B | 98/05/21 |
| ○···· | 4 | Object | Single-sided,multi-page doc. | 10 | A | 98/01/13 |
| ○···· | 5 | People | Double-sided,multi-page doc. | 31 | A | 98/05/21 |
| ○···· | 6 | Snow | Large colour image | 11 | C | 98/05/21 |
| ○···· | 7 | Shop | Simple colour bar chart | 10 | B | 98/01/13 |
| ○···· | 8 | | | 9 | | 98/05/21 |
| ○···· | 9 | | | 15 | | 98/05/21 |
| ○···· | 10 | | | 16 | | 98/05/21 |
| △···· | 11 | | | 0 | | |
| △···· | 12 | | | 0 | | |
| △···· | 13 | | | 0 | | |
| △···· | 14 | | | 0 | | |
| △···· | 15 | | | 0 | | |
| △···· | 16 | | | 0 | | |
| △···· | 17 | | | 0 | | |
| △···· | 18 | | | 0 | | |
| □···· | * | | | 0 | | |

*FIG. 15*

| Properties | No. | Title | Subject | Pages | Rank | Entry Date |
|---|---|---|---|---|---|---|
| ○ · · · · | 1 | Car | Double-sided,multi-page doc. | 31 | A | 98/05/21 |
| ○ · · · · | 2 | God | Large colour image | 12 | C | 98/05/21 |
| ○ · · · · | 3 | Monument | Simple colour bar chart | 11 | B | 98/05/21 |
| ○ · · · · | 4 | Object | Single-sided,multi-page doc. | 10 | A | 98/01/13 |
| ○ · · · · | 5 | People | Double-sided,multi-page doc. | 31 | A | 98/05/21 |
| ◎ · · · · | 6 | Car | Double-sided,multi-page doc. | 11 | C | 98/05/21 |
| ◎ · · · · | 7 | God | Large colour image | 10 | B | 98/01/13 |
| ◎ · · · · | 8 | Monument | Simple colour bar chart | 9 | | 98/06/30 |
| ◎ · · · · | 9 | Object | Single-sided,multi-page doc. | 15 | | 98/05/21 |
| ◎ · · · · | 10 | People | Double-sided,multi-page doc. | 16 | | 98/05/21 |
| △ · · · · | 11 | Snow | Large colour image | 0 | | |
| △ · · · · | 12 | Shop | Simple colour bar chart | 0 | | |
| △ · · · · | 13 | Amazon | Double-sided,multi-page doc. | 0 | | |
| △ · · · · | 14 | Festival | Large colour image | 0 | | |
| △ · · · · | 15 | Colour Graph | Simple colour bar chart | 0 | | |
| △ · · · · | 16 | | | 0 | | |
| △ · · · · | 17 | | | 0 | | |
| △ · · · · | 18 | | | 0 | | |
| □ · · · · | * | | | 0 | | |

FIG. 16

| Properties | No. | Title | Subject | Pages | Rank | Entry Date |
|---|---|---|---|---|---|---|
| ○ · · · · | 1 | Car | Double-sided, multi-page doc. | 31 | A | 98/05/21 |
| ○ · · · · | 2 | God | Large colour image | 12 | C | 98/05/21 |
| ○ · · · · | 3 | Monument | Simple colour bar chart | 11 | B | 98/05/21 |
| ○ · · · · | 4 | Object | Single-sided, multi-page doc. | 10 | A | 98/01/13 |
| ○ · · · · | 5 | People | Double-sided, multi-page doc. | 31 | A | 98/05/21 |
| ○ · · · · | 6 | Snow | Large colour image | 11 | A | 98/05/21 |
| ○ · · · · | 7 | Shop | Simple colour bar chart | 10 | B | 98/01/13 |
| △ · · · · | 8 | | | 0 | | |
| △ · · · · | 9 | | | 0 | | |
| △ · · · · | 10 | | | 0 | | |
| △ · · · · | 11 | God | Large colour image | 0 | | |
| △ · · · · | 12 | Monument | Simple colour bar chart | 0 | | |
| △ · · · · | 13 | Object | Single-sided, multi-page doc. | 0 | | |
| △ · · · · | 14 | People | Double-sided, multi-page doc. | 0 | | |
| △ · · · · | 15 | Snow | Large colour image | 0 | | |
| △ · · · · | 16 | | | 0 | | |
| △ · · · · | 17 | | | 0 | | |
| □ · · · · | * | | | 0 | | |

FIG. 17

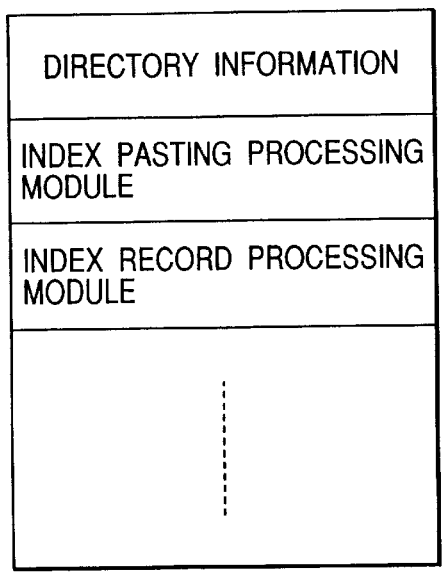

| DIRECTORY INFORMATION |
|---|
| INDEX PASTING PROCESSING MODULE |
| INDEX RECORD PROCESSING MODULE |
| ⋮ |

FIG. 19

| Properties | No. | User-ID | Name | Pages | Entry Date | Revision Date | Cabinet |
|---|---|---|---|---|---|---|---|
| ○ · · · | 1 | 134 | | 0 | 98/0722 | 98/0722 | 199801 |
| ○ · · · | 2 | 256 | | 0 | 98/0722 | 98/0722 | 199801 |
| ○ · · · | 3 | 10 | | 0 | 98/0722 | 98/0722 | 199801 |
| ○ · · · | 4 | 4 | | 0 | 98/0722 | 98/0722 | 199801 |
| ○ · · · | 5 | 256 | | 0 | 98/0722 | 98/0722 | 199801 |
| ○ · · · | 6 | 565 | | 0 | 98/0722 | 98/0722 | 199801 |
| ○ · · · | 7 | 111 | | 0 | 98/0722 | 98/0722 | 199801 |
| ○ · · · | 8 | 4 | | 0 | 98/0722 | 98/0722 | 199801 |
| ○ · · · | 9 | 4 | | 0 | 98/0722 | 98/0722 | 199801 |
| ○ · · · | 10 | 134 | | 0 | 98/0722 | 98/0722 | 199801 |
| □ · · · | * | | | | | | 199801 |

FIG. 20

|   | A | B | C | D | E |
|---|---|---|---|---|---|
| 1 | User-ID | Name | | | |
| 2 | 134 | Mark Taylor | | | |
| 3 | 256 | James Edmond | | | |
| 4 | 4 | Bill Clark | | | |
| 5 | 10 | Iola Smith | | | |
| 6 | 111 | Tom Brown | | | |
| 7 | 565 | Jane Hamilton | | | |
| 8 | | | | | |
| 9 | ▯ | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |

FIG. 21

|   | A | B | C | D | E |
|---|---|---|---|---|---|
| 1 | User-ID | Name | | | |
| 2 | 134 | Mark Taylor | | | |
| 3 | 256 | James Edmond | | | |
| 4 | 4 | Bill Clark | | | |
| 5 | 10 | Iola Smith | | | |
| 6 | 111 | Tom Brown | | | |
| 7 | 565 | Jane Hamilton | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |

FIG. 22

| FILE (F) | EDIT (E)   SEARCH (S)   HELP (H) |
|---|---|
| User-ID | Name |
| 134 | Mark Taylor |
| 256 | James Edmond |
| 4 | Bill Clark |
| 10 | Iola Smith |
| 111 | Tom Brown |
| 565 | Jane Hamilton |

FIG. 23

| FILE (F) | EDIT (E)   SEARCH (S)   HELP (H) |
|---|---|
| User-ID | Name |
| 134 | Mark Taylor |
| 256 | James Edmond |
| 4 | Bill Clark |
| 10 | Iola Smith |
| 111 | Tom Brown |
| 565 | Jane Hamilton |

FIG. 24

| Properties | No. | User-ID | Name | | Pages | Entry Date | Revision Date | Cabinet |
|---|---|---|---|---|---|---|---|---|
| ○ | 1 | 134 | | | 0 | 98/0722 | 98/0722 | 199801 |
| ○ | 2 | 256 | | | 0 | 98/0722 | 98/0722 | 199801 |
| ○ | 3 | 10 | | | 0 | 98/0722 | 98/0722 | 199801 |
| ○ | 4 | 4 | | | 0 | 98/0722 | 98/0722 | 199801 |
| ○ | 5 | 256 | | | 0 | 98/0722 | 98/0722 | 199801 |
| ○ | 6 | 565 | | | 0 | 98/0722 | 98/0722 | 199801 |
| ○ | 7 | 111 | | | 0 | 98/0722 | 98/0722 | 199801 |
| ○ | 8 | 4 | | | 0 | 98/0722 | 98/0722 | 199801 |
| ○ | 9 | 4 | | | 0 | 98/0722 | 98/0722 | 199801 |
| ○ | 10 | 134 | | | 0 | 98/0722 | 98/0722 | 199801 |
| □ | * | | | | 0 | | | 199801 |

FIG. 27

| Properties | No. | User-ID | Name | Pages | Entry Date | Revision Date | Cabinet |
|---|---|---|---|---|---|---|---|
| ○ | 1 | 134 | Mark Taylor | 0 | 98/0722 | 98/0722 | 199801 |
| ○ | 2 | 256 | James Edmond | 0 | 98/0722 | 98/0722 | 199801 |
| ○ | 3 | 10 | Iola Smith | 0 | 98/0722 | 98/0722 | 199801 |
| ○ | 4 | 4 | Bill Clark | 0 | 98/0722 | 98/0722 | 199801 |
| ○ | 5 | 256 | James Edmond | 0 | 98/0722 | 98/0722 | 199801 |
| ○ | 6 | 565 | Jane Hamilton | 0 | 98/0722 | 98/0722 | 199801 |
| ○ | 7 | 111 | Tom Brown | 0 | 98/0722 | 98/0722 | 199801 |
| ○ | 8 | 4 | Bill Clark | 0 | 98/0722 | 98/0722 | 199801 |
| ○ | 9 | 4 | Bill Clark | 0 | 98/0722 | 98/0722 | 199801 |
| ○ | 10 | 134 | Mark Taylor | 0 | 98/0722 | 98/0722 | 199801 |
| □ | * | | | 0 | | | 199801 |

FILE MANAGEMENT SYSTEM, FILE MANAGEMENT METHOD, AND STORAGE MEDIUM

BACKGROUND OF THE INVENTION

1. Field of the Invention

The present invention relates to a file management system, a file management method, and a storage medium, and particularly to a file management system having a plurality of files stored therein and having a file list which contains index information put together for each file, a file management method applied to the file management system, and a storage medium for storing a program for executing the file management method.

2. Related Background Art

Conventionally, there is known an image management system in which a manuscript image such as a document or a drawing is read and appropriately edited and the image is recorded to a magnetic disk or an optical magnetic disk for a management.

In general, in this type of an image management system, image information obtained by reading a manuscript image is compressed before being recorded to a hard disk or an optical disk. In addition, index information for an image search is related with the image information for recording.

A required image is searched for on the basis of this index information and the image information is read out so as to be displayed on a display unit or the image is output to a record sheet by a printer. Furthermore, various types of image processing such as adding, editing, or processing an image is performed, if necessary.

Referring to FIGS. 18A and 18B, there is shown a block diagram of a constitution of a conventional and general document management system. FIG. 18A illustrates a constitution used for scanning a manuscript with a scanner and storing the image in a document database. A scanner 120 electrically reads a manuscript and converts the read image to digital signals with a photoelectric conversion element or the like. A scanner control part 121 controls an operation of the scanner 120. An index input part 123 inputs an index for the read image. A database management part 122 manages the index and the image. A document database 124 is used for storing images or index information. In this diagram, arrows indicate information flows.

First, an image read from a manuscript with the scanner 120 is sent to the database management part 122 via the scanner control part 121. In the database management part 122, index information inputted from the index input part 123 is added to the image received from the scanner control part 121 and they are stored in the document database 124.

FIG. 18B illustrates a constitution used for searching for a desired image from the document database with a search part. A document database 130 is used for storing images and indices therefor. A database management part 131 manages the document database 130. A search part 132 searches for a desired image from the document database 130 and it searches for an image according to search conditions inputted from a search condition input part 133. A search result list management part 134 manages search results. A reference numeral 135 indicates a search result list. In this diagram, arrows indicate information flows.

First, conditions of an image required to be searched for are inputted from the search condition input part 133, an image which satisfies the conditions is searched for using the search part 132, and the search result is output to the search result list 135 via the search result list management part 134. The search result list management part 134 can specify a display of the document which has been searched for on the basis of the search result list.

In the above conventional document management system, however, there are problems described below and their improvement has been desired. In other words, a document recording operation is separated from a search operation. Also in the recording operation, fixed procedures have been used for the image scanning and the index input operation. Furthermore, in the recording operation, the document recording operation and the index input operation have been performed for each document.

Therefore, an operator must perform the scanning and the index input operation alternately, which makes operations complicated and leads to a low productivity. Additionally, due to the separation of the recording operation from the search operation, it is not easy to perform operations of searching for a document for reusing index data which has been used in the past to reference or copy the index data of the search result displayed in a document list as index data of a document to be inputted.

In addition, incorrect data inputted by an incorrect operation must be modified following a search operation after the recording operation is terminated once, which requires a lot of operation steps and operation time.

Furthermore, if a plurality of indices must be modified, they cannot be modified at a time.

There are suggested methods of reducing a time for an index input by using other applications such as a spread sheet program to create index data separately and to paste the index data on a document list for using the data.

In these methods, however, the paste data is pasted on the document list in an original array and therefore there is a problem that the original data must be created in an order of a display on the document list. Additionally, there is a problem that a worker is unlikely to notice a deviation of rows in the document list in case of an occurrence of the deviation.

In addition, there is a problem that if an input of a plurality of identical indices is required the same content must be inputted repeatedly even if an external application is used.

SUMMARY OF THE INVENTION

In view of these problems, it is an object of the present invention to provide a file management system, a file management method, and a storage medium, in which efficient document indexing is enabled.

According to one aspect of the present invention, there is provided a file management system comprising a reading means for reading files, an image display control means for displaying images of the read files in an image display part, a list control means for displaying a list of the files in a list display part, an index information input means for inputting index information of the files registered in the list on the list display part, an index information storing means for storing the inputted index information, and a search means for searching for the files on the list display part on the basis of the stored index information, wherein the list control means includes an index information editing means for editing the index information of the files.

BRIEF DESCRIPTION OF THE DRAWINGS

FIG. 3 is a diagram of a display screen of a document list W;

FIGS. 4A and 4B are diagrams of a display screen for a search operation on the document list W;

FIGS. 5A and 5B are diagrams of a display screen for a new record operation on the document list W;

FIGS. 6A and 6B are diagrams of a display screen for a post-input of index information on the document list W;

FIGS. 7A and 7B are diagrams of a display screen for pre-input of index information in the document list W;

FIGS. 8A and 8B are diagrams of a display screen for recording an image for a pre-input file of the index information on the document list W;

FIG. 9 is a diagram of an index data created on a spread sheet;

FIG. 10 is a diagram of an index data created on a text editor;

FIG. 11 is a diagram of a screen on which a search result is displayed in the document list;

FIG. 12 is a diagram of a screen on which a range of 10 documents and two items is selected;

FIG. 15 is a diagram of a document list screen as a result of batch indexing;

FIG. 16 is a diagram of a document list screen as a result of index data pasting processing;

FIG. 17 is a diagram of a memory map of a floppy disk as a storage medium;

FIG. 19 is a diagram of a document list as a result of an index pre-input;

FIG. 20 is a diagram of a spread sheet on which index data is described;

FIG. 21 is a diagram of a spread sheet after a copy range is selected;

FIG. 22 is a diagram of index data created on a text editor;

FIG. 23 is a diagram of index data on the text editor after a copy range is selected;

FIG. 24 is a diagram of a document list on which a range of 10 documents and two items has been selected;

FIG. 27 is a diagram of a document list as a result of the index data pasting processing.

DETAILED DESCRIPTION OF THE PREFERRED EMBODIMENTS

First Embodiment

A description will be made below for embodiments of a file management system, a file management method, and a storage medium of the present invention. File management systems according to these embodiments are applied to a document management system.

(Hardware Constitution)

Figure 1:
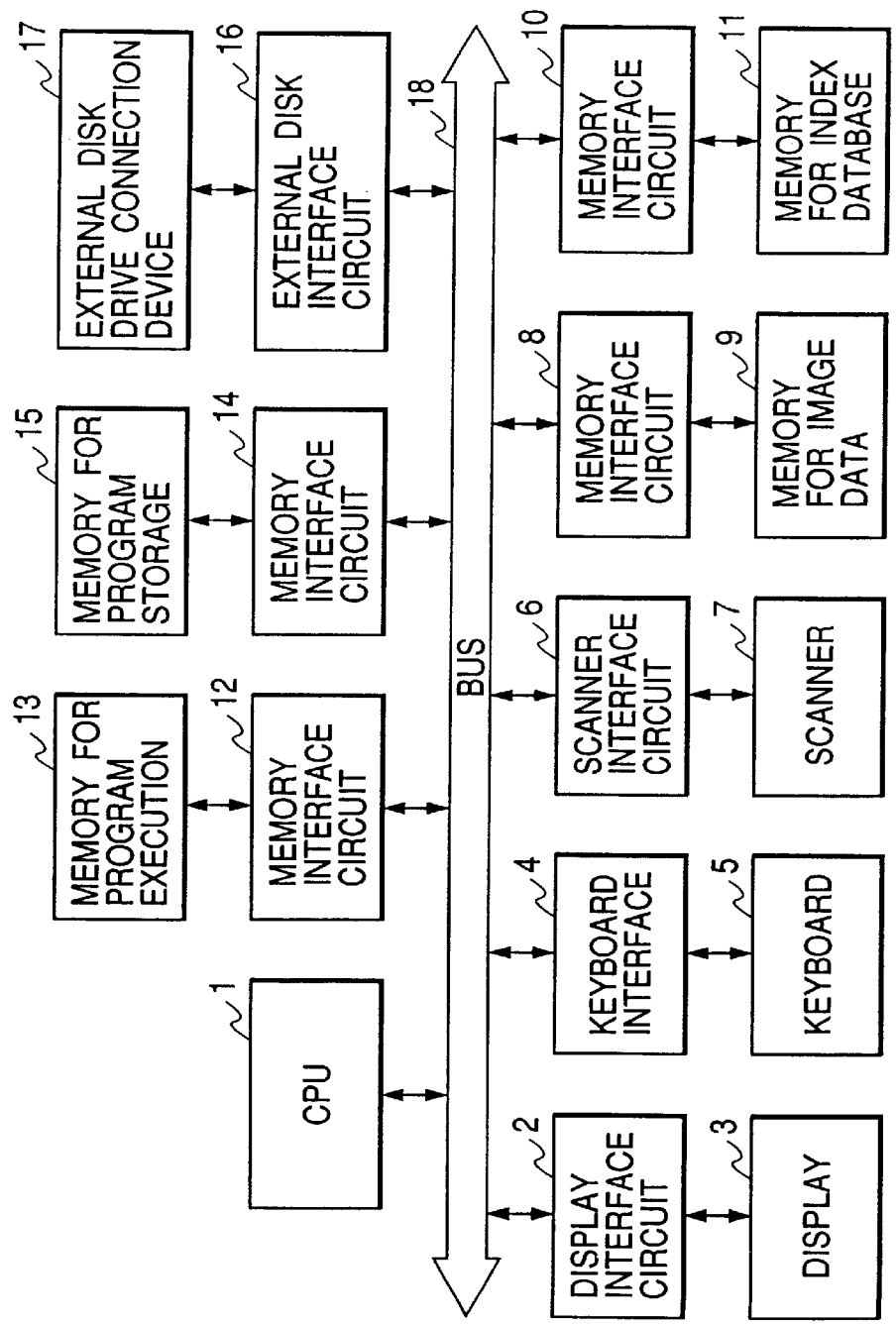
FIG. 1 is a block diagram of a constitution of a file management system according to an embodiment of the present invention.

Referring to FIG. 1, there is shown a block diagram of a constitution of a document management system according to a first embodiment. In this diagram, a central processing unit (CPU) 1 controls the entire document management system and is connected to a bus 18 for transmitting image information or instruction information of various operations.

A CRT display 3, which displays an image of the image information or a document list for a user, is connected to the bus 18 via a display interface circuit 2. A keyboard or a pointing device 5, which is used for a user to give instructions on various operations of the document management system, is connected to the bus 18 via a keyboard interface circuit 4.

A scanner 7, which reads image information from a subject, is connected to the bus 18 via a scanner interface circuit 6. A magnetic disk or an optical magnetic disk (memory for an image data) 9, which is used for storing image information and identification information for managing each image information, is connected to the bus 18 via a memory interface circuit 8.

An index database memory 11, in which is recorded a database for storing various index information which has been inputted by a user with being related to the image identification information, is connected to the bus 18 via a memory interface circuit 10.

A RAM (a memory for a program execution) 13 used for running a program of a filing system is connected to the bus 18 via a memory interface circuit 12. A magnetic disk or an optical magnetic disk (a memory for a program storage) 15, which is used for storing the program of the filing system, is connected to the bus 18 via a memory interface circuit 14.

A disk drive (an external disk drive connection device) 17, which is used for connecting a floppy disk or the like in which the program of the filing system is stored, is connected to the bus 18 via an external disk interface circuit 16.

Generally in this hardware constitution, a program for implementing a document management system is supplied by a floppy disk or the like. The program stored in the floppy disk is read from a disk drive 17 before using (execution) the program and stored in the magnetic disk 15. Afterward, the program is loaded into the RAM 13 and executed by the CPU 1.

(Software Processing)

Figure 2:
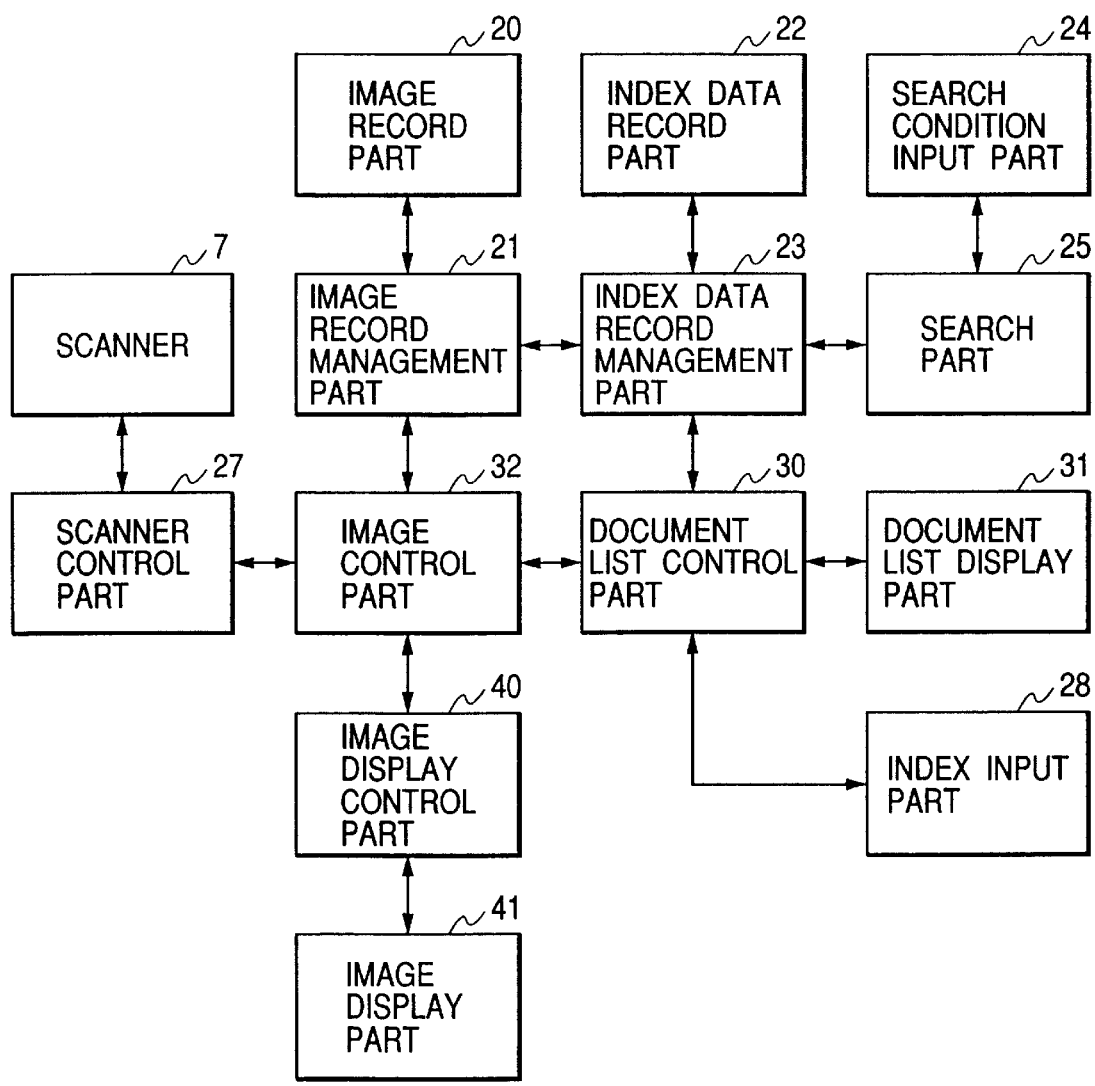
FIG. 2 is a block diagram of processing functions of a document management system realized by the hardware constitution in FIG. 1.

Referring to FIG. 2, there is shown a block diagram of a processing function of the document management system implemented with the hardware constitution in FIG. 1. In this diagram, there are shown an image record part 20 for recording an image as document information, an image record management part 21 for managing data in the image record part 20 with keeping consistency, and an index data record part 22 for recording index data for searching for a document.

There are further shown an index data record management part 23 for managing data in the index data record part 22 with keeping consistency, a search condition input part 24 for inputting search conditions for a search for a desired document, and a search part 25 for a search for the desired document from the database. The search condition input part 24 comprises a keyboard and a search condition input screen.

A scanner 7 is used for reading image data from a manuscript such as a drawing, a scanner control part 27 is for controlling the scanner 7, and an index input part 28 is for inputting index data. A document list control part 30 controls a document list display part 31 which displays a document list. An image control part 32 controls a document image and an image display control part 40 controls an image display part 41 to display the document image.

A document list control part 30 controls the document list display part 31 and is connected to the index data record management part 23, the image control part 32, and the index input part 28. The image control part 32 is connected to the image record management part 21, the document list control part 30, the scanner control part 27, and the image display control part 40.

A description will be made below for document search, document record, and index input operations in the document management system having the above constitution.

(Search Operation)

First, a user inputs search conditions for searching for a desired document from the search condition input part 24. As the search conditions, there are keywords, for example. The inputted search conditions are transmitted to the search part (generally referred to as a search engine) 25, and the search part 25 finds out a document which satisfies the search conditions from the document database via the index data record management part 23 for managing data of the index data record part 22 and outputs the result to the document list control part 30. If it finds out a document satisfying the search conditions, the document list control part 30 prepares a document list from the result and displays it to the document list display part 31 (generally, comprising a CRT and CRT control circuit).

(New Record)

A user starts the scanner control part 27 to read a new document from the scanner 7. The scanner 7 reads a content of a predetermined number of manuscript sheets and outputs image data of the read manuscript sheets to the image control part 32. The image control part 32 records the image data into the image record part 20 via the image record management part 21 and reports new document creating information to the document list control part 30.

The document list control part 30 creates a new record on the basis of the new document creating information and adds it to the already displayed document list for a display. On this record are updated document attributes defined at scanning corresponding to the document inputted from the scanner 7 such as an entry date and the number of pages. The updated document attributes are recorded into the index data record part 22 via index data record management part 23.

(Post-index)

A user instructs the document list control part 30 to start an index input. This instruction puts the document list control part 30 in a mode for receiving an output from the index input part 28. The user inputs a predetermined index (in this case, of a document scanned anew) from the index input part 28. The inputted index is displayed at a predetermined place in the list by the document list control part 30. The inputted index data is recorded into the index data record part 22 via the index data record management part 23 automatically or by a user's instruction to the document list control part 30.

(Pre-index)

In a pre-index operation in which index information is inputted prior to an input of a document, a user instructs the document list control part 30 to perform a pre-index operation. By this instruction, the document list control part 30 enables an index input which is currently not related to image data for a new record at the lowest end of the document list. Then, the user inputs a new index data from the index input part 28. This data is displayed in the document list by the document list control part 30 and recorded into the index data record part 22 via the index data record management part 23, if necessary.

(Recording Image for Pre-index Record)

A user inputs image data corresponding to the above pre-index record. The user selects a pre-index record for which the image data is inputted for the document list control part 30, first. Next, the image data is read from the scanner 7 with the scanner control part 27. The image data is sent to the image display part 41 via the image display control part 40 by the image control part 32 and sent to the image record management part 21 so as to be recorded into the image record part 20. The image record part 20 transmits address information of the recorded image to the document list control part 30 via the image control part 32 or directly.

Read-in information such as the number of document pages is sent from the image control part 32 to the document list control part 30. The document list control part 30 records this read-in information into the index data record part 22 via the index data record management part 23 and changes a status of the corresponding record in the document list from the pre-index record to an ordinary document. Furthermore, the document list control potion 30 updates a display of the document list. It is also possible for the system to have a constitution in which the address information of the recorded image is directly transmitted from the image record management part 21 to the index data record management part 23.

(Constitution of Document List)

Referring to FIG. 3, there is shown a diagram of a display screen of the document list W. The document list W is created by the document list control part 30 and displayed on the CRT. In this document list W, files as a search result and new files inputted from the scanner are displayed. A property column 51 indicates a file status, a file number column 52 indicates a number in the list, and columns 53 and 54 indicate document index items. A column 55 indicates the number of pages of each file and a column 57 indicates an entry date when an image of a subject is recorded by the scanner 7.

A user can freely design the index items according to a type of the document by using a database structure setting part which is not shown. In the example shown in FIG. 3, a Title item 53 for indicating a document title, a Chapter item 54 for indicating each end of chapters in a document, and a Rank item 56 for indicating an evaluation of a document are added as the index information for a document management. The order of these columns can be arbitrarily changed.

The document list W in FIG. 3 shows image recorded files and pre-index files each having only previously inputted index on the same screen in a manner in which a user can clearly distinguish between them. Icons (○, △) in the items 58 and 59 indicate states of respective files in the Properties column 51; an icon 58 (○) indicates that image information is already recorded in a file, an icon 59 (△) indicates that image information has not been recorded yet in a file and it is a pre-index file. Therefore, in the document list W in FIG. 3, it is easily understood that the files having file numbers 1 to 10 indicated by ranges 60 and 61 are image recorded files and that the files having file numbers 11 to 15 indicated by range 62 are pre-index files.

The files in the range 60 are existing files in which image information and index information displayed as a result of a search with the search part 25 are recorded, the files in the range 61 are new files in which image information is stored while index information is not inputted, and the files in the range 62 are pre-index files in which only index information is recorded.

(Search Operation)

Referring to FIGS. 4A and 4B, there is shown a diagram of a display screen for executing a search operation in the document list W. The document list W in FIG. 4A shows a display status of all documents stored without search conditions and it is an example of an initial status. If a user inputs "A" in the Rank column as a search condition in the search condition input part 24 at this point, the search part 25 finds out a record (file) satisfying the search condition from the index data record part 22 via the index data record management part 23 on the basis of the search condition and outputs the result to the document list control part 30. The document list control part 30 creates a document list based on the result and displays it in the document list display part 31. FIG. 4B shows a display screen of a document list W which has been created with this search operation and displayed.

(New Record)

Referring to FIGS. 5A and 5B, there is shown a diagram of a display screen for executing a new record operation in the document list W. A document list prior to a new record operation is shown in FIG. 5A. Now, a new document is read using the scanner 7 and new document creating information is reported to the document list control part 30.

The document list control part 30 creates a new record on the basis of the new document creating information and adds it to the already displayed document list for a display. Created and updated document attributes are recorded into the index data record part 22 via the index data record management part 23. FIG. 5B shows a display screen of a document list W which is displayed after this recording operation of the new document. Records (files) having file numbers 4, 5, and 6 have been created and there are displayed the number of pages corresponding to the image information scan, entry dates, and icons in the Properties column for indicating file attributes.

(Post-index)

Referring to FIGS. 6A and 6B, there is shown a diagram of a display screen for executing an index information post-input operation in the document list W. A user instructs the document list control part 30 to start an index input. This instruction causes the document list control part 30 to enter a mode for receiving an output from the index input part 28 as shown in FIG. 6A.

A user inputs a predetermined index from the index input part 28. The input index is displayed at a predetermined place in the list by the document list control part 30 and is recorded into the index data record part 22 via the index data record management part 23 automatically or by a user's instruction to the document list control part 30.

After a completion of an input operation of a single index item, it is possible to start an input operation of the next index item (in the next column on the right side, for example). In the same manner, after a completion of an index input operation into a single record (file), it is possible to start an index input operation into the next record (file) (in the next row of the list, for example). For example, an index input is started from the Title column of the file number 4 as shown in FIG. 6A and the index input operation is continuously performed up to the Rank column of the file number 6 as shown in FIG. 6B.

Furthermore, it is also possible to limit a specification of input columns to Chapter and Rank for a continuous input.

(Pre-index)

Referring to FIGS. 7A and 7B, there is shown a diagram of a display screen for executing an index information pre-input operation in the document list W. A user instructs the document list control part 30 to start a pre-index. This instruction causes the document list control part 30 to enable an index input currently not related to image data for the lowest new record in the document list as shown in FIG. 7A.

A user inputs new index data from the index input part 28. This data is displayed in the document list by the document list control part 30 and is recorded into the index data record part 22 via the index data record management part 23, if necessary.

After a completion of an input operation of a single index item, it is possible to start an input operation of the next index item. In the same manner, after a completion of an index input operation into a single record (file), it is possible to move to an index input operation for the next record (file), and at this point a file not related to the image data is created as a pre-index file. For example, an index input is started from the Title column of the new file as shown in FIG. 7A and the index input operation is continuously performed up to the Chapter column of the file number 9 as shown in FIG. 7B. The pre-index files having the file numbers 7, 8, and 9 are created in this manner.

(Recording Image into Pre-index Record)

Referring to FIGS. 8A and 8B, there is shown a display screen for recording an image into a pre-index file of the index information in the document list W. A user selects a pre-index record in which image data is to be inputted as shown in FIG. 8A for the document list control part 30, first.

The image data is read from the scanner 7 by the scanner control part 27. The image data is sent to the image display part 41 via the image display control part 40 by the image control part 32 and sent to the image record management part 21 so as to be recorded into the image record part 20. The image record part 20 transmits address information of the recorded image to the document list control part 30 via the image control part 32 or directly.

Read-in information such as the number of document pages is sent from the image control part 32 to the document list control part 30. The document list control part 30 records this read-in information into the index data record part 22 via the index data record management part 23 and changes a status of the corresponding record in the document list from the pre-index record to an ordinary document.

Furthermore, the document list control potion 30 updates a display of the document list. FIG. 8B shows a display screen of the document list W which has been created by this recording operation of the new document and displayed. Image information is inputted into the files having file numbers 7, 8, and 9 and the number of pages, the entry dates, and the icons of the Properties column for indicating file attributes are updated in the list.

Although individual operations have been described in order in this embodiment, the order of the operations are not limited to this, but they can be executed in a user's request order of the predetermined operations.

Subsequently, a description will be made below for a method of batch indexing with a data copy for a plurality of records on a document list and for a plurality of fields by using a document management system, in order of (1) Copying index data, (2) Selecting index data pasting range, and (2) Pasting index data.

(1) Copying index data

In the copying index data processing, a copy is created from text data of text editor, spread sheet, or other applications or from index data displayed in the document list of a document management system.

This copy is created in a general method. The general method includes a method of an input from a copy menu selected out of menu items (not shown) of the application or of an input with a shortcut key allocated to a copy operation on a keyboard.

Referring to FIG. 9, there is shown a diagram of index data created on the spread sheet.

A range of desired data is selected by using a pointing device out of index data on the spread sheet and its copy processing is executed. The number of rows on the spread sheet corresponds to the number of records on the document list of the document management system and the number of columns corresponds to the number of fields on the document list. FIG. 9 shows a selected condition of index data in a range of 10 rows and two columns.

Referring to FIG. 10, there is shown a diagram of index data created on the text editor. A range of desired data is selected by using a pointing device out of index data on the text editor and its copy processing is executed.

The number of rows (the number of character strings delimited by a line feed code) on the text editor corresponds to the number of records on the document list of the document management system and the number of columns (the number of character strings delimited by a specific separator on a single row) corresponds to the number of fields on the document list.

While a tab key is used as a specific separator in this embodiment, it is also possible to use a space key, a comma, an arbitrary character, a character string, a symbol, a numeric, or the like as a separator. FIG. 10 shows a selected condition of index data in a range of two rows and three columns.

Referring to FIG. 11, there is shown a diagram of a display screen of a search result on the document list. In the search operation, a range of desired index data is selected by using a pointing device out of the document list and its copy processing is executed. FIG. 11 shows a selected condition of index data in a range of five rows and two columns.

(2) Selecting index data pasting range

An index data pasting range is selected by a pointing device or keyboard operation. FIG. 12 shows a diagram of a screen on which a range of two items, Title and Subject, are selected for 10 documents. Indexing is performed within this range. In the selected range, there are search result records, new document records, and pre-index records together.

(3) Pasting index data

Figure 13:
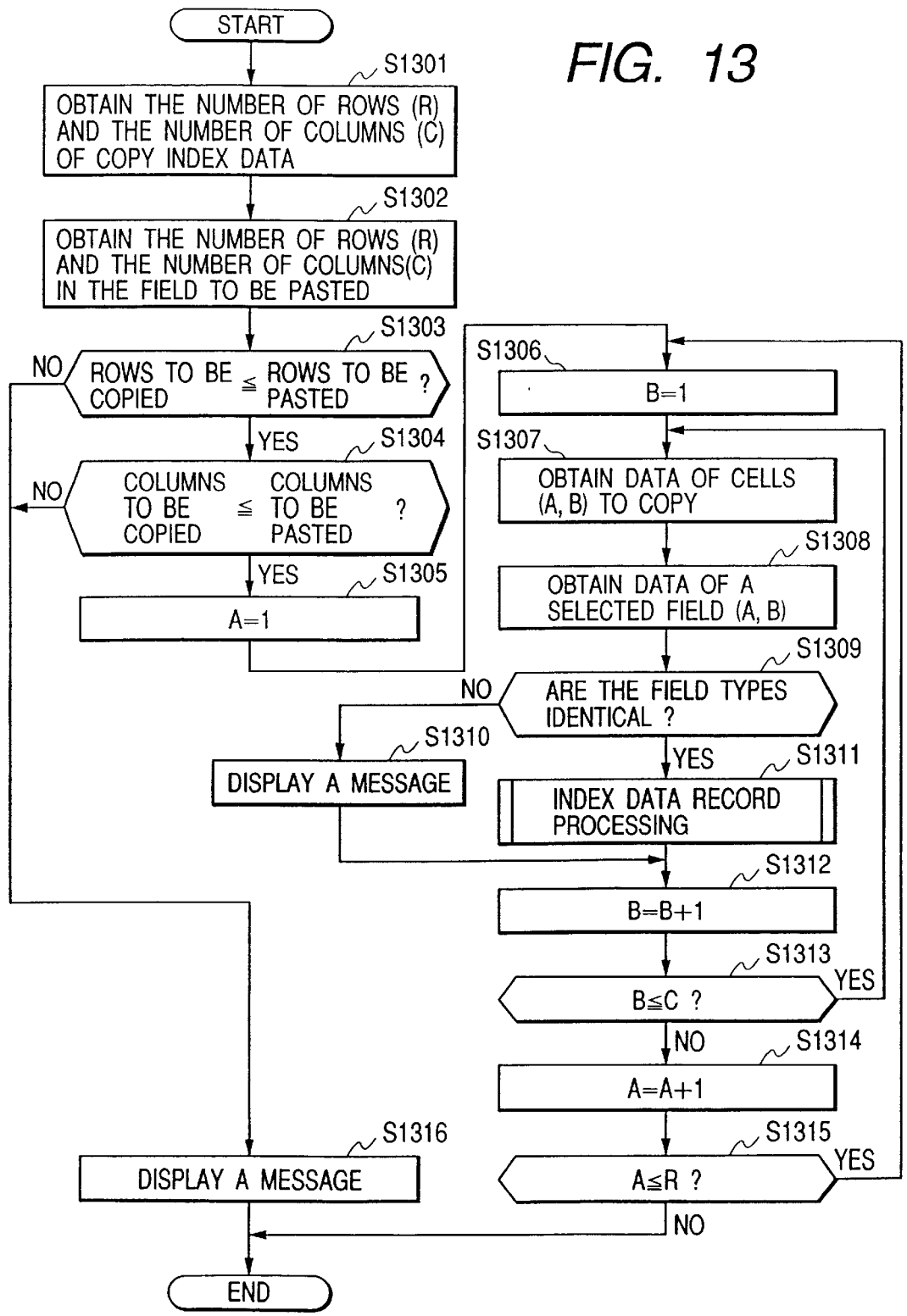
FIG. 13 is a flowchart of an index data pasting processing procedure.

Referring to FIG. 13, there is shown a flowchart of a index data pasting processing procedure. This processing program is supplied with a floppy disk as described above. The program stored in the floppy disk is read from a disk drive 17 before the program is used (execution) and stored in the magnetic disk 15. Afterward, the program is loaded into the RAM 13 and executed by the CPU 1.

If a user gives an instruction on pasting index data, the number of rows (R) and the number of columns (C) of the copy index data are obtained, first (Step S1301). Next, are obtained the number of rows (the number of records) and the number of columns (the number of fields) in the document list whose range is selected by the user (Step S1302).

The number of rows (the number of rows of copy data) obtained in Step S1301 is compared with the number of rows (the number of rows for pasting data) obtained in Step S1302 (Step S1303). If the number of rows of the copy data is equal to or smaller than the number of rows for pasting data, copy processing can be performed for all the records whose range is specified. Then, the number of columns obtained in Step S1301 (the number of columns of copy data) is compared with the number of columns obtained in Step S1302 (Step S1304). If the number of columns of the copy data is equal to or smaller than the number of columns for pasting data, copy processing can be performed for all the fields whose range is specified.

A value "1" is set to a variable A (Step S1305). It indicates a first row of the copied index data. A value "1" is set to a variable B (Step S1306). It indicates a first column of the copied index data.

Copy index data in a position of the first row and the first column is obtained (Step S1307). A cell at the uppermost left in the selected range as copy data is obtained as a selected cell in the first row and the first column (Step S1308). Types are checked for the index data obtained in Step S1307 and the selected cell obtained in Step S1308 (Step S1309).

In other words, it is determined whether or not the obtained index data can be recorded as a field of the selected cell with checking the field type such as "text", "numeric", and "date". For example, if the index data is "Object" which is text data and the field type of the selected cell is "text," index data record processing is performed determining it as recordable data (Step S1311). In this processing, index data record processing is performed according to a copy record, which is described later. Then, to obtain index data to be recorded subsequently, a value for the next column (B+1 substituted for B) is obtained (Step S1312).

On the other hand, if index data is "Object" which is text data and the field type of the selected cell is "numeric" in Step S1309, for example, a message is displayed indicating that the index data cannot be recorded in the selected cell judging it to be nonrecordable data (Step S1310), the index data is not recorded, and the control shifts to processing in Step S1312.

The value B obtained in Step S1312 is compared with the number of columns C obtained in Step S1301 (Step S1313). If the value B obtained in Step S1312 is equal to or smaller than the number of columns C obtained in Step S1301, it means that indexing has not been completed yet for a single row, and therefore the control returns to processing in Step S1307. On the other hand, if the value B obtained in Step S1312 is greater than the number of columns C obtained in Step S1301, it means that the indexing has been completed for a single row, and therefore a value for the next row (A+1 substituted for A) is obtained to execute index data record processing for the next row (Step S1314).

The value A obtained in Step S1314 is compared with the number of rows R obtained in Step S1301 (Step S1315). If the value A obtained in Step S1314 is smaller than the number of rows R obtained in Step S1301, it means that record processing has not been completed yet for all the index data, and therefore the control returns to processing in Step S1306. On the other hand, if the value A obtained in Step S1314 is greater than the number of rows R obtained in Step S1301, it means that the record processing has been completed for all the index data, and therefore processing is terminated.

On the other hand, if the number of rows of copy data is greater than the number of rows for pasting data in Step S1303 or if the number of columns of copy data is greater than the number of columns for pasting data in Step S1304, the selected range of the copy data is larger than the selected range for pasting data, and therefore a message is displayed indicating that index data record processing cannot be performed (Step S1316) and the processing is terminated. In the processing procedure as described above, the index data pasting processing is performed.

Figure 14:
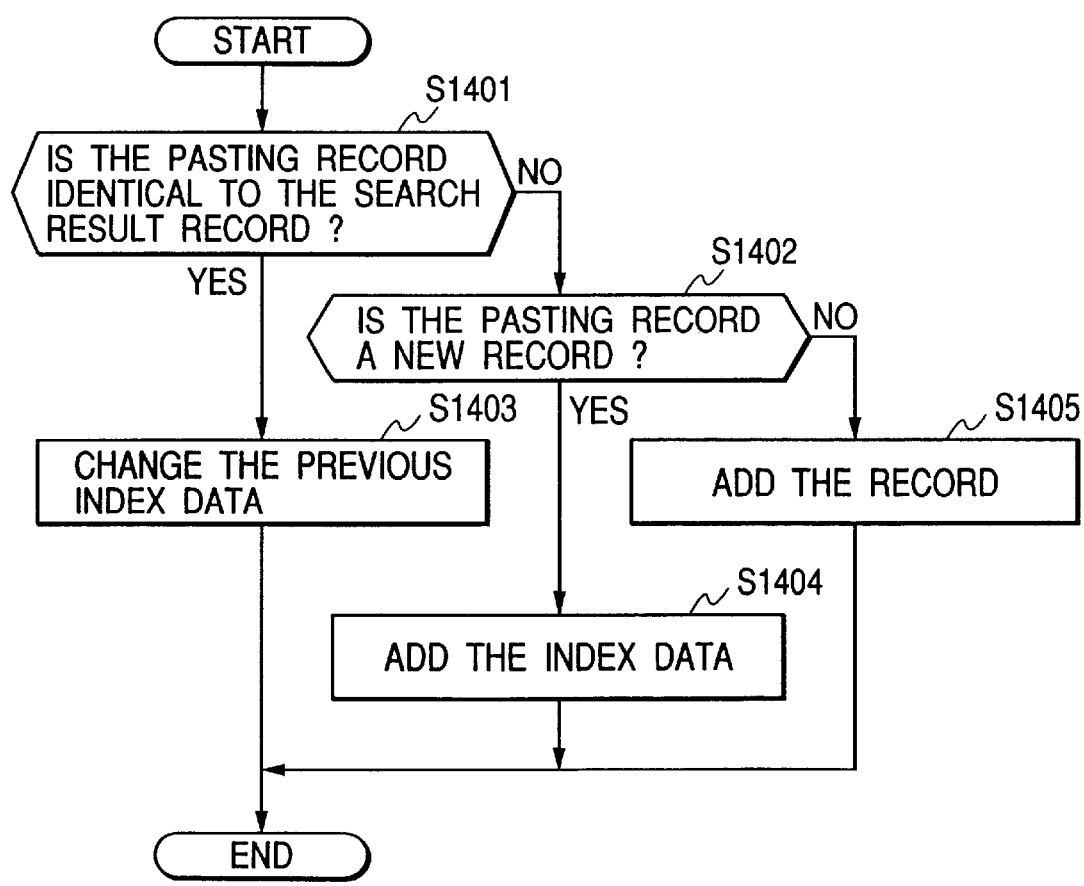
FIG. 14 is a flowchart of an index data recording processing procedure in Step S1311.
Figure 18A:
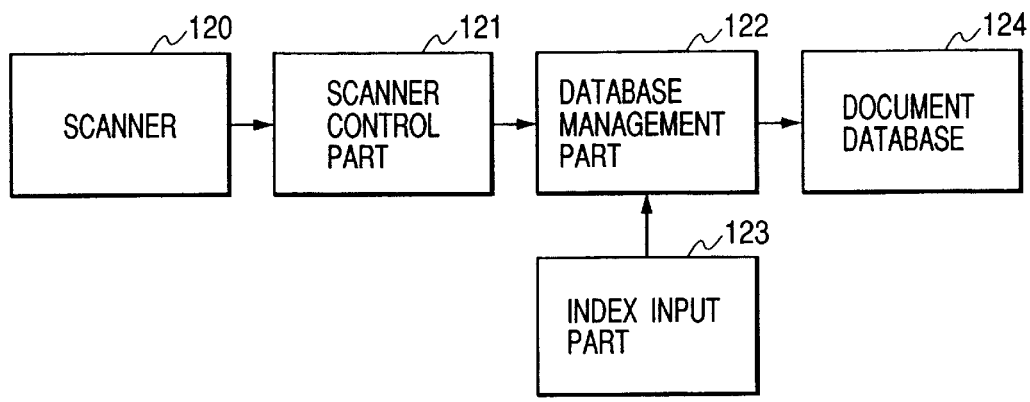
FIGS. 18A and 18B are block diagrams of a constitution of a conventional and general document management system.
Figure 18B:
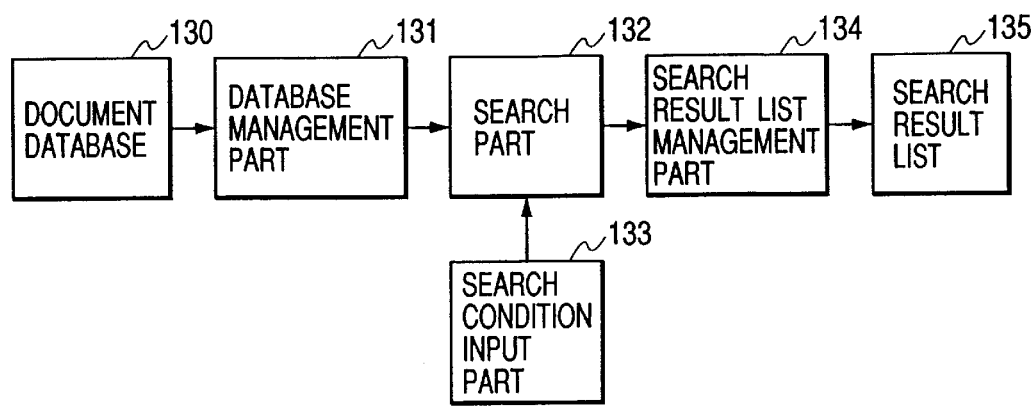

Referring to FIG. 14, there is shown a flowchart of index data record processing procedure in Step S1311. It is judged whether or not the copy record is a record displayed as a search result (a search result record) (Step S1401). If it is not a search result record, it is judged whether or not a pasted record is a record displayed as a new record result (a new record) (Step S1402). If it is a new record, new data which is not recorded in the index data record part 22 is recorded so as to be associated with document image data (Step S1404).

On the other hand, if it is not a new record, it is considered as a record not associated with a document image, in other words, as a pre-index record, and a new record is added (Step S1405).

If the record is judged to be a search result record in Step S1401, index data of the search result record has already been recorded in the index data record part. Therefore, after the index data is detected, the data is deleted and new data is recorded (Step S1403), and then the processing is terminated. In this processing procedure, the index data record processing is performed.

Referring to FIG. 15, there is shown a diagram of a document list screen as a result of batch indexing. If index data is pasted by using the selected range on the spread sheet in FIG. 9 for copying data and the selected range on the document list in FIG. 12 for pasting data, batch indexing can be executed as shown in FIG. 15. In the Properties column of the records in which existing index data is updated in the search result records, an icon ⊚ is appended.

Referring to FIG. 16, there is shown a diagram of a document list screen as a result of index data pasting processing. If index data is pasted by using the selected range on the document list in FIG. 11 for copying data and by adding pre-index records in this document list, the result as shown in FIG. 16 is obtained.

The "Title" and "Subject" items of the file numbers 2 to 6 are pasted on the "Title" and "Subject" items of the file numbers 11 to 15 by batch indexing.

Although the indexing processing is not performed before the processing is terminated if the selected range of the copy index data is larger than the selected range for pasting data in the document list in the above embodiment, index data can be pasted only for the selected range on the document list.

In addition, although index data is pasted by selecting a range of existing records in the document list in the above embodiment, index data can be pasted while creating new records by selecting the record at the lowest end of the document list and pasting index data.

Furthermore, although document files are treated in the above embodiment, not only document files, but image files such as graphic files or photographs can be treated.

The present invention can be applied to a system comprising a plurality of devices or to an apparatus comprising a single device. It is apparent that the present invention can be applied to a case in which it is implemented by supplying a program to a system or an apparatus. In this case, the system or the apparatus can enjoy the effect of the present invention by a readout from the storage medium containing a program represented by software for implementing the present invention.

In this embodiment, as set forth in the above, the program for implementing the document management system is supplied by a floppy disk. The program stored in the floppy disk is read from a disk drive 17 before the program is used (executed) and stored into a magnetic disk 15. Afterward, the program is loaded into the RAM 13 so as to be executed by the CPU 1.

Referring to FIG. 17, there is shown a diagram of a memory map of the floppy disk as a storage medium. The ROM contains an index data pasting processing module shown in the flowchart of FIG. 13 and an index data record processing module shown in the flowchart in FIG. 14.

Not only a floppy disk, but a ROM, a hard disk, an optical disk, an optical magnetic disk, a CD-ROM, a CD-R, a DVD, a magnetic tape, a nonvolatile memory card, or the like can be used as a storage medium.

According to a file management system of this embodiment, a high productivity can be achieved by performing efficient document indexing.

Furthermore, it is possible to display a search result on a single document list, to record a new document, and to index the document. Particularly, it is not necessary to provide a search mode and a record mode, by which operation steps can be reduced.

In addition, the order of inputting a document from a scanner and an index is arbitrarily selected by an operator, by which a degree of freedom in the operation is remarkably improved. This leads to an easiness of a restoring operation of an operation error, by which a superior operability is achieved.

Furthermore, a plurality of documents can be processed in a scan operation or an index input operation at a time, by which a high productivity is achieved.

In indexing a new document, an index of an existing document can be referred to.

The operability is enhanced by integrating the search operation, the image recording operation, and an index input operation and by a batch processing of a plurality of documents in this manner.

According to a file management system of this embodiment, the index information input means copies previously prepared text data, which makes it easier to search for a document for reusing index data which has been used in the past so that index data displayed as a search result on the document list is referenced or copied as index data of a document to be inputted.

According to a file management system of this embodiment, the index information editing means edits a single index information, and therefore index data can be easily modified.

According to a file management system of this embodiment, the index information editing means edits a plurality of index information at a time, and therefore a plurality of indices can be modified at a time if it is necessary.

According to a file management system of this embodiment, there is provided a judging means for judging whether or not the index information is appropriate for an input field type, and therefore a correct field type of index data can be inputted.

According to a file management system of this embodiment, index information can be edited for files in which only index information is recorded, and therefore it can be applied to various files.

Second Embodiment

A second embodiment of the present invention will be described below with reference to accompanying drawings. Although a hardware constitution and software processing of a second embodiment are considerably identical with those of the first embodiment, they are described again in this section.

(Hardware Constitution)

Referring to FIG. 1, there is shown a block diagram of a hardware constitution of a file management system according to a second embodiment of the present invention.

A central processing unit (CPU) 1 controls the entire file management system and is connected to a bus 18 as an information transmission means for transmitting image information or instruction information of various operations. A CRT display 3, which displays an image of the image information or a document list for a user, is connected to the bus 18 via a display interface circuit 2. A keyboard 5 including a pointing device, which is used for a user to give instructions on various operations of the file management system, is connected to the bus 18 via a keyboard interface circuit 4. A scanner 7, which reads image information from a subject, is connected to the bus 18 via a scanner interface circuit 6. A memory 9 for storing image information and identification information for managing each image information comprises a magnetic disk or an optical magnetic disk and is connected to the bus 18 via a memory interface circuit 8. An index database memory 11 for storing a database containing various index information inputted by a user with being related to the image identification information is connected to the bus 18 via a memory interface circuit 10. A memory 13 for running a program of a file management system comprises a RAM and is connected to the bus 18 via a memory interface circuit 12. A memory 15 for storing a program of the file management system comprises a magnetic disk or an optical magnetic disk and is connected to the bus 18 via a memory interface circuit 14. An external disk drive connection device (disk drive) 17, which is used for connecting a floppy disk or the like containing the program of the file management system to this system, is connected to the bus 18 via an external disk interface circuit 16.

A program executed in a file management system is supplied with a floppy disk or the like from outside to the file management system. The program stored in the floppy disk is read from an external disk drive connection device 17 before starting the program run and stored in the memory 15. Subsequently, the program is loaded into the memory 13 and run by the CPU 1.

(Software Processing Constitution)

Referring to FIG. 2, there is shown a diagram of a constitution of various functions achieved by performing the file management processing in the file management system. There are shown an image record part 20 for recording an image of a document, an image record part management means 21 for managing data in the image record part 20 with keeping consistency, an index data record part 22 for recording index data for searching for a document, an index data record part management means 23 for managing data in the index data record part 22 with keeping consistency, a search condition input means 24 for inputting search conditions for a search for a desired document, and a search means 25 for a search for the desired document from the database. The search condition input means 24 comprises a keyboard and a search condition input screen. A scanner 26 is used for reading image data from a manuscript, a scanner control means 27 is for controlling the scanner 26, and an index input means 28 is for inputting index data. A document list control means 30 manages and controls a document list display means 31 which displays a document list.

An image control means 32 controls a document image and an image display part control means 40 controls an image display part 41 to display the document image.

The document list control means 30 controls the document list display means 31 and is connected to the index data record part management means 23, the image control means 32, and the index input means 28.

The image control means 32 is connected to the image record part management means 21, the document list control means 30, the scanner control means 27, and the image display part control means 40.

A description will be made below for document search, document new record, and index input operations in the above constitution.

(Search Operation)

First, a user inputs search conditions for searching for a desired document from the search condition input means 24. As the search conditions, there are keywords, for example.

The inputted search conditions are transmitted to the search means (generally referred to as a search engine) 25, and the search means 25 finds out a document which satisfies the search conditions from the document database in the index data record part 22 via the index data record part management means 23 and outputs the result to the document list control means 30. The document list control means 30 prepares a document list from the result and displays it to the document list display means 31 (generally, comprising a CRT and CRT control circuit).

(New Record)

Next, a user starts the scanner control means 27 to read a new document from the scanner 26. The scanner 26 reads a content of a predetermined number of manuscript sheets and outputs the image data to the image control means 32. The image control means 32 records the image data into the image record part 20 via the image record part management means 21 and reports new document creating information to the document list control means 30.

The document list control means 30 creates a new record on the basis of the new document creating information with adding it to the already displayed document list for a display. This record includes document attributes defined at scanning such as an entry date and the number of pages. The updated document attributes are recorded into the index data record part 22 via index data record part management means 23.

(Post-index)

Next, a user instructs the document list control means 30 to start an index input. This instruction puts the document list control means 30 in a mode for receiving an output from the index input means 28. The user inputs an index from the index input means 28. In this embodiment, an index corresponding to the above document scanned anew is inputted. The inputted index is displayed at a predetermined place in the document list by the document list control means 30. The inputted index data is sent to and recorded into the index data record part 22 via the index data record part management means 23 automatically or by a user's instruction to the document list control means 30.

(Pre-index)

It is also possible to perform a pre-index in which index information is inputted prior to an input of a document. A description will be made below for a pre-index operation.

A user instructs the document list control means 30 to perform a pre-index operation. By this instruction, the document list control means 30 enables an index input for a new record at the lowest end of the document list. This new record is currently not related to the image data. Next, the user inputs a new index data from the index input means 28. This data is displayed in the document list by the document list control means 30 and recorded into the index data record part 22 via the index data record part management means 23, if necessary.

(Recording Image for Pre-index Record)

A user can input image data corresponding to the above pre-index record. The user selects a pre-index record corresponding to input image data for the document list control means 30, first. Subsequently, the image data is read from the scanner 26 by the scanner control means 27. The image data is sent to the image display part 41 via the image display part control means 40 by the image control means 32 and sent to the image record part management means 21 so as to be recorded into the image record part 20. The image record part 20 transmits address information of the recorded image to the document list control means 30 via the image control means 32 or directly. Read-in information such as the number of document pages is sent from the image control means 32 to the document list control means 30. The document list control means 30 records this read-in information into the index data record part 22 via the index data record part management means 23 and changes a status of the corresponding record in the document list from the pre-index record to an ordinary document. Furthermore, the document list control means 30 updates a display of the document list.

It is also possible for the system to have a constitution in which the address information of the recorded image is directly transmitted from the image record part management means 21 to the index data record part management means 23.

Subsequently, the above operations will be described on the document list in further detail below.

(Constitution of Document List)

Referring to FIG. 3, there is shown a diagram of a document list W. The document list W is created by the document list control means 30 and displayed on the display 3. In this document list W, files as a search result and new files inputted from the scanner 26 are displayed. A properties column 51 indicates a file status, a file number column 52 indicates a number in the list, columns 53, 54, and 56 indicate document index items for documents, a column 55 indicates the number of pages of each file, and a column 57 indicates an entry date when an image of a subject is recorded by the scanner 26. A user can freely design the index items according to a type of a document by using a database structure setting means which is not shown. In the example shown in FIG. 3, a title item 53 for indicating a document title, a chapter item 54 for indicating each end of chapters in a document, and a rank item 56 for indicating an evaluation of a document are added as index information for a document management. The order of these columns can be arbitrarily changed.

The document list W in FIG. 3 shows image recorded files and pre-index files having only previously inputted index on the same screen in a manner in which a user can clearly distinguish between them. In other words, icons 58 and 59 in the Properties column 51 indicate states of respective files; the icon 58 indicates that image information is already recorded in the file and the icon 59 indicates that image information has not been recorded yet in the file and that it is a pre-index file. Therefore, in the document list W in FIG. 3, it is easily understood that the files having file numbers 1 to 10 indicated by ranges 60 and 61 are image recorded files and that the files having file numbers 11 to 15 indicated by range 62 are pre-index files.

The files in the range 60 are existing files in which image information and index information are recorded, the files in the range 61 are new files in which image information is stored while index information has not been inputted yet, and the files in the range 62 are pre-index files in which only index information is recorded.

(Search Operation)

Referring to FIGS. 4A and 4B, there are shown diagrams of a document list W for a search operation. The document list W in FIG. 4A shows a display status of all stored documents and it is an example of an initial status before starting a search operation. If a user inputs "A" in the Rank column as a search condition in the search condition input means 24 at this point, the search means 25 finds out a file satisfying the search condition from the index data record part 22 via the index data record part management means 23 and outputs the result to the document list control means 30. The document list control means 30 creates a document list based on the result and displays it on the document list display means 31. FIG. 4B shows a display screen of a document list W which has been created with this search operation and displayed as described in the above.

(New Record)

Referring to FIGS. 5A and 5B, there are shown diagrams of a document list W for a new record operation. A document list prior to a new record operation is shown in FIG. 5A. Now, a new document is read using the scanner 26 and new document creating information is reported to the document list control means 30. The document list control means 30 creates a new record on the basis of the new document creating information with adding it to the already displayed document list for a display. Updated document attributes are recorded into the index data record part 22 via the index data record part management means 23.

FIG. 5B shows a document list W which is displayed after the above new document recording operation. Files having file numbers 4, 5, and 6 shown in FIG. 5B are created and the image information is inputted to display the number of pages, entry dates, and icons on the document list W and to display icons indicating file attributes in the Properties column.

(Post-index)

Referring to FIGS. 6A and 6B, there are shown diagrams of a document list W for post-index information operation.

A user instructs the document list control means 30 to start an index input. This instruction causes the document list control means 30 to enter a mode for receiving an output from the index input means 28 as shown in FIG. 6A. Subsequently, a user inputs a predetermined index from the index input means 28. The inputted index is displayed at a predetermined place in the list by the document list control means 30. The inputted index data is recorded into the index data record part 22 via the index data record part management means 23 automatically or by a user's instruction to the document list control means 30.

After a completion of an input operation of a single index item, it is possible to start an input operation of the next index item (in the next index column on the right side, for example). In the same manner, after a completion of an index input operation into a single file, it is possible to start an index input operation into the next file (a file in the next row of the list, for example). For example, an index input is started from the Title column of the file number 4 as shown in FIG. 6A and the index input operation is continuously performed up to the Rank column of the file number 6 as shown in FIG. 6B.

(Pre-index)

Referring to FIGS. 7A and 7B, there are shown diagrams of a document list W for pre-index information pre-input.

A user instructs the document list control means 30 to start a pre-index. This instruction causes the document list control means 30 to enable an index input for a new record at the lowest end of the document list as shown in FIG. 7A. Next, a user inputs new index data from the index input means 28. This data is displayed in the document list by the document list control means 30 and is recorded into the index data record part 22 via the index data record part management means 23, if necessary.

After a completion of an input operation of a single index item, it is possible to move to an input operation of the next index item. In the same manner, after a completion of an index input operation into a single file, it is possible to start an index input operation for the next file, and at this point a file not related to the image data is created as a pre-index file. For example, an index input is started from the Title column of the new file in the example of FIG. 7A and the index input operation is continuously performed up to the Chapter column of the file number 9 as shown in FIG. 7B. The pre-index files having the file numbers 7, 8, and 9 are created in this embodiment.

(Recording Image Into Pre-index Record)

Referring to FIGS. 8A and 8B, there are shown diagrams of a document list W for recording an image for a pre-input file of the index information.

A user selects a pre-index record for the document list control means 30, first. In other words, a record corresponding to image data to be inputted is selected. Subsequently, the image data is read from the scanner 26 by the scanner control means 27. The image data is sent to the image display part 41 via the image display part control means 40 by the image control means 32 and sent to the image record part management means 21 so as to be recorded into the image record part 20. The image record part 20 transmits address information of the recorded image to the document list control means 30 via the image control means 32 or directly. Then, read-in information such as the number of document pages is sent from the image control means 32 to the document list control means 30. The document list control means 30 sends this read-in information to be recorded into the index data record part 22 via the index data record part management means 23 and changes a status of the corresponding record in the document list from the pre-index record to an ordinary document. Furthermore, the document list control means 30 updates a display of the document list.

FIG. 8B shows a display screen of the document list W which has been created by the above new document recording operation for a display. Image information is inputted into the files having file numbers 7, 8, and 9 in FIG. 8B, the number of pages and the entry dates are updated in the document list, and the icons in the Properties column for indicating file attributes are changed from icon 59 to icon 58.

Next, a method of batch indexing (index input) with copying data is described for a plurality of records (files) or a plurality of fields in a document list. This method consists of the following operations; (1) Pre-index, (2) Creating all indices, (3) Copying index data, (4) Selecting index data pasting range, and (5) Pasting index data. These operations are described below in order.

(1) Pre-index

First, a pre-index record is created in a method of the above pre-index. FIG. 19 shows a document list as a result of a pre-index. In this processing, a pre-index field is only "User-ID" field in the leftmost column in a range of the field columns from the "User-ID" field to the "Cabinet" field displayed in FIG. 19. Hereinafter, this field is referred to as "a key field of a document list."

An image can be recorded for the pre-index record immediately after this pre-index operation.

(2) Creating all Indices

Referring to FIG. 20, there is shown a spread sheet in which index data is described. As shown in FIG. 20, index data having user IDs and all of the corresponding data with the user names is prepared by using a spread sheet program. At this point, the leftmost cell field in FIG. 20 (hereinafter, referred to as "a key field of copy index" is used for user IDs and is associated with the key field in the document list for which the pre-index is performed.

Additionally instead of the spread sheet program, the text editor can be used for creating index data having user IDs and all of the corresponding data with the user names in the same manner. Referring to FIG. 22, there is shown a diagram of index data created on the text editor. In FIG. 22, the number of rows (the number of character strings delimited by a line feed code) on the text editor corresponds to the number of records on the document list and the number of columns (the number of character strings delimited by a specific separator in a single row) corresponds to the number of fields on the document list. Although a tab key is used as a specific separator in this embodiment, a space key, a comma (,), an arbitrary character, a character string, a symbol, a numeric value, or the like can be used as a separator.

(2) Copying index data

Copy processing is executed in a general method. As the general method, there is copy processing with a copy menu which can be selected out of menu items (not shown) of an application or with an input of a shortcut key allocated to copy processing from a keyboard.

For index data on the spread sheet in FIG. 20, as shown in FIG. 21, a range of desired data is selected by using a pointing device or the like to execute the copy processing. FIG. 21 shows that index data of six rows and two columns is selected.

For index data created on the text editor shown in FIG. 22, as shown in FIG. 23, a range of desired data is selected by using a pointing device or the like to execute the copy processing. FIG. 23 shows that index data of six rows and two columns is selected.

(4) Selecting index data pasting range

An index data pasting range is selected by an operation with a pointing device, a keyboard, or the like on the document list.

Referring to FIG. 24, there is shown a diagram illustrating a range of 10 documents and two items selected on a document list.

(5) Pasting index data

Figure 25:
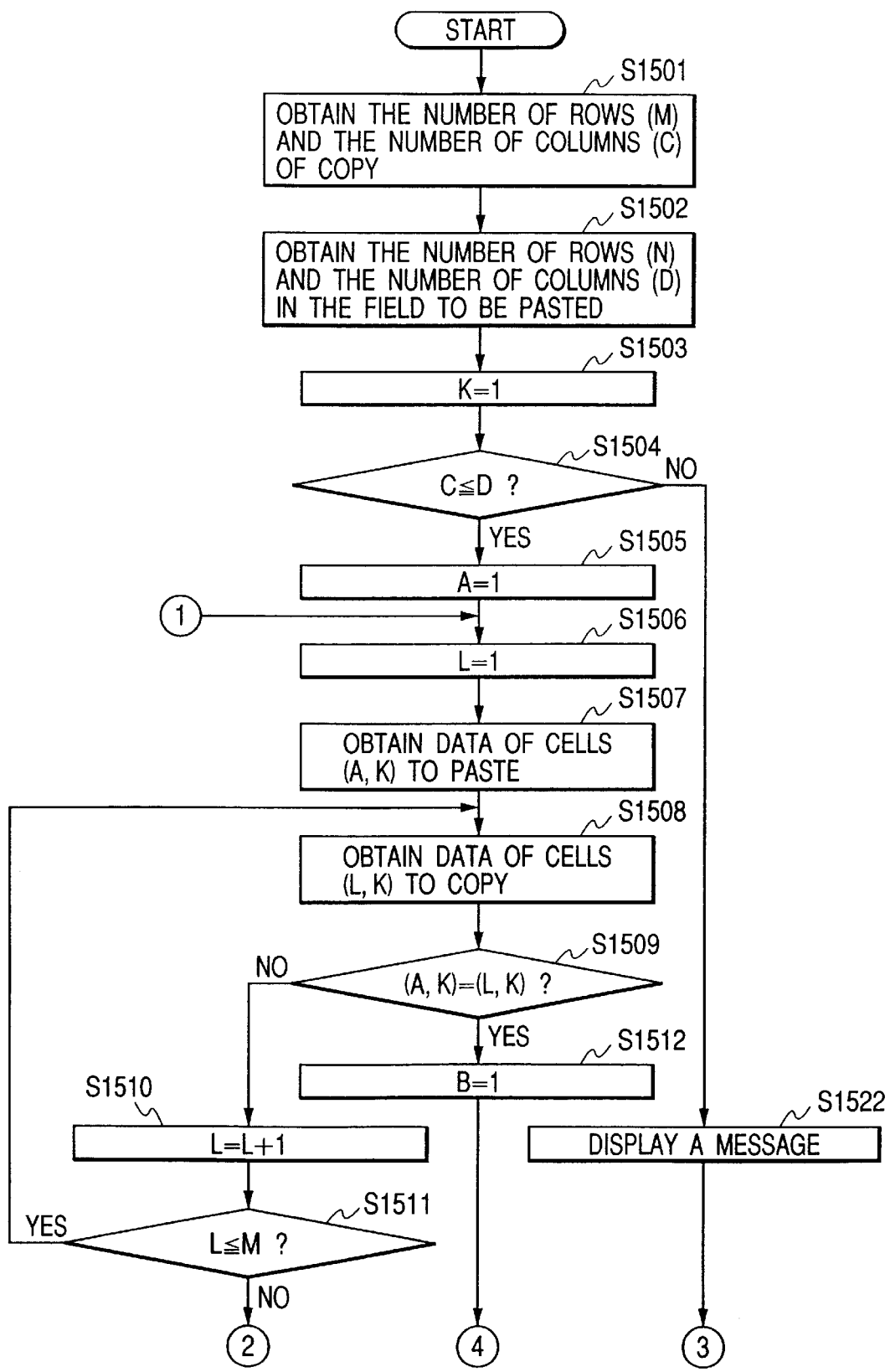
FIG. 25 is a flowchart of a processing procedure for pasting index data on the document list.
Figure 26:
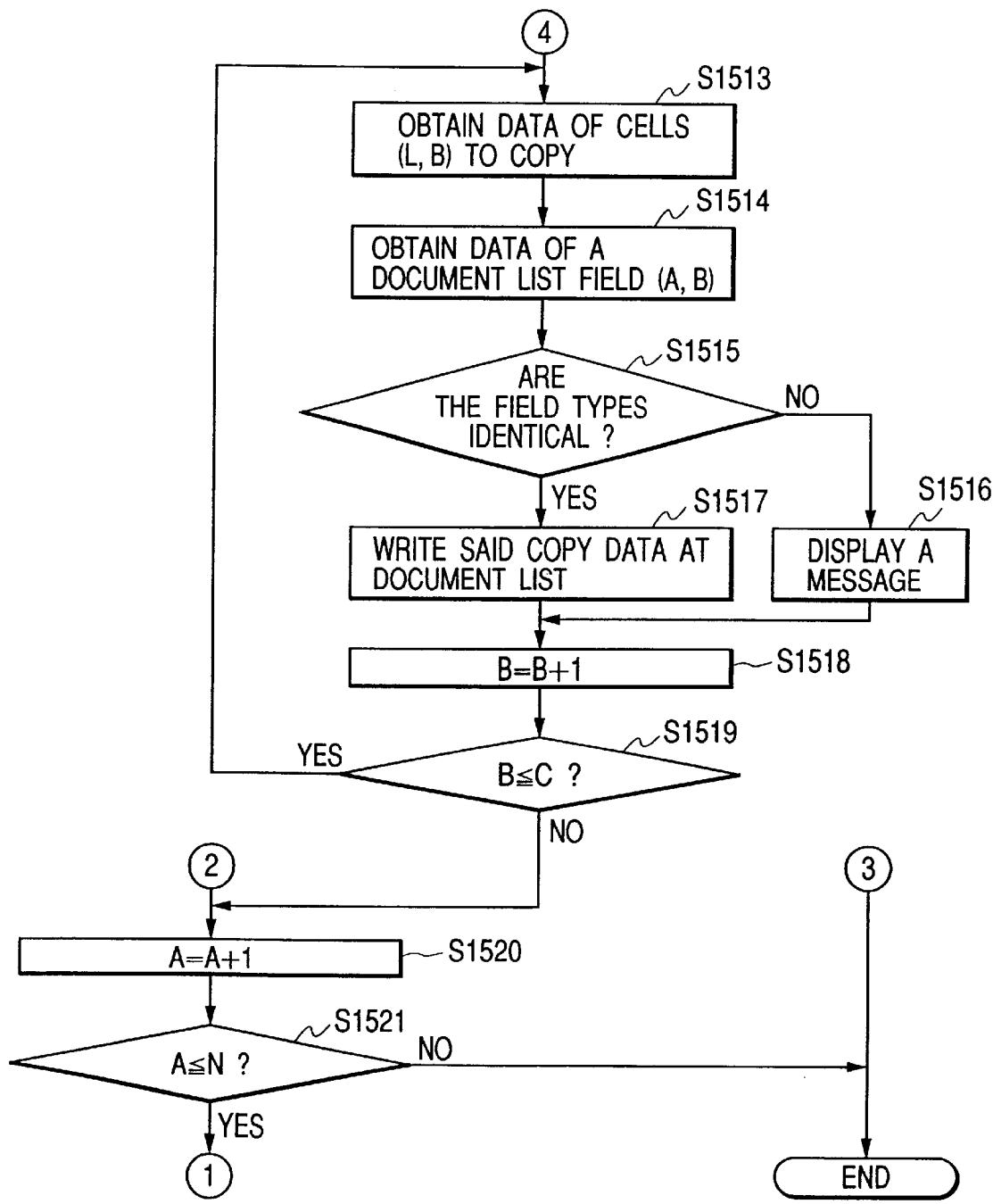
FIG. 26 is a flowchart of a processing procedure for pasting index data on the document list.

Referring to FIGS. 25 and 26, there are shown flowcharts of an outline of a processing procedure of pasting index data on a document list. This procedure will be described below following steps of the flowcharts.

If a user gives an instruction on pasting index data, the number of rows M (=6) and the number of columns C (=2) of the copy index data are obtained.

The number of rows N (=10) and the number of columns (the number of fields) D (=2) are obtained for a range selected as a pasting range on the document list by the user.

A value 1 is set to K. K indicates a key field column in the document list and in the copy index data.

The number of columns of copy data C obtained in Step S1501 is compared with the number of columns for pasting data D obtained in Step S1502. If the number of columns of copy data C is equal to or smaller than the number of columns for pasting data D, all the columns can be pasted on the field whose range is specified, and therefore the operation in Step S1505 is executed. If the number of columns of copy data C is greater than the number of columns for pasting data D, there are columns which cannot be pasted, and therefore the operation in Step S1522 is executed.

A value "1" is set to A. A indicates a row of the document list.

A value 1 is set to L. L indicates a row of the copy index data.

Data described in a field of row A and column K in the document list is obtained.

Data described in a cell of row L and column K in the copy index data is obtained.

It is checked that the data obtained in Step S1507 is identical with the data obtained in Step S1508. If they are identical, the control progresses to Step S1512.

Otherwise, L is incremented by one [S1510] and L is compared with M [S1511]. If L is equal to or smaller than M, the control returns to Step S1508. If L is greater than M, there is no key field match, in other words, no index to be pasted on the document list, and therefore the control progresses to Step S1520.

A value 1 is set to B. B indicates a column in the document list.

Data in a cell of row L and column B is obtained from the copy index data.

Data in a field of row A and column B is obtained from the document list.

It is checked that the field type of the index data obtained in Step S1513 is identical with the field type of the document list data obtained in Step S1514. The field types are, for example, "text," "numeric," "date," or the like used for checking that the obtained index data can be recorded into the document list. For example, if the index data is "Object" which is text data and the field type of the document list is "text," it is determined to be recordable data and processing in Step S1517 is executed. If the index data is "Object" which is text data and the field type of the document list is "numeric," it is determined to be nonrecordable data and processing in Step S1516 is executed.

A message is displayed for indicating that the index data cannot be recorded in the document list. The index data is not recorded.

The index data obtained in Step S1513 is written into the field of row A and column B in the document list.

To obtain index data to be recorded next, B is incremented by 1.

B is compared with C. If B is greater than C, indexing for a single row is completed, and therefore processing in Step S1520 is executed. If B is equal to or smaller than C, indexing has not been completed yet for a single row, and therefore the control returns to Step S1513.

To execute pasting processing for the index data of the next row, A is incremented by 1.

A is compared with N. If A is greater than N, pasting processing for all the index data is completed, and therefore the processing is terminated. If A is equal to or smaller than N, pasting processing has not been completed yet for some index data, and therefore the control returns to Step S1506.

A message is displayed for indicating that the index data cannot be pasted since the number of columns of copy data C is greater than the number of columns for pasting data D, and the processing is terminated.

As described above, index data pasting processing is performed.

For example, if index data is pasted by using the selected range on the spread sheet in FIG. 21 or the selected range on the text editor in FIG. 23 for copying data and the selected range on the document list in FIG. 24 for pasting data, the result as shown in FIG. 27 is obtained. FIG. 27 shows a document list as a result of the index data pasting processing.

Although index data is copied on the spread sheet or on the text editor and pasting processing is performed on the basis of the copy in this embodiment, it is also possible to create index data in another apparatus and transmit the data to a file management system via a storage, a network, or the like so as to paste the index data in the file management system, instead.

Although the first column is treated as a key field in this embodiment, it is apparent that another column can be used as a key field. In addition, it is also possible to apply a constitution in which columns in different positions can be specified for the copy data and the pasted data as columns to be key fields.

Furthermore, it is also possible to apply a constitution in which a plurality of columns can be specified as key fields.

Although indexing processing is not performed before the end of the processing procedure if the selected range of the copy index data is greater than the selected range for pasting data in the document list in this embodiment, it is possible to paste index data only in the selected range on the document list, instead.

In addition, the present invention can be applied to a system comprising a plurality of devices or an apparatus comprising a single device.

It is apparent that the present invention is achieved by supplying a storage medium containing software program codes for realizing functions of the above embodiments to a system or an apparatus so that a computer (or CPU or MPU) of the system or the apparatus can read out the program codes stored in the storage medium so as to run the program codes.

In this case, the program codes themselves read out from the storage medium performs the functions of the above embodiments and the storage medium containing the program codes forms the present invention.

As storage mediums for supplying the program codes, there are a floppy disk, a hard disk, an optical disk, an optical magnetic disk, a CD-ROM, a CD-R, a magnetic tape, a nonvolatile memory card, a ROM or the like, for example.

It is apparent that the present invention is not limited to the functions of the above embodiments realized by running the program codes read out by the computer, but includes functions of the above embodiments realized by actual processing partially or entirely performed by an operating system running in the computer on the basis of an instruction of the program codes.

Furthermore, it is apparent that the present invention also includes functions of the above embodiments realized by actual processing partially or entirely performed by the CPU in a feature expansion board or a function expansion unit on the basis of instructions of program codes read out from the storage medium after the program codes are written into a memory in the function expansion board inserted in the computer or in the function expansion unit connected to the computer.

As described in details above, according to the present invention, an item in a specified column previously specified on a file list is set to an item in a predetermined column on an index data table and index information is put together on the index data table. Then, data described in a certain row in the specified column on the file list is read out to search for data identical with the read out data among data described in respective rows constituting the predetermined column on the index data table. If the identical data is found, a copy is made from data in the row on the index data table in which the found data has been described and it is pasted on the certain row on the file list.

By the above processing, efficient document indexing is achieved.

In other words, copy data is not pasted on a document list in an original array, and therefore original data need not be created in an order of a display on the document list. In addition, rows will not be deviated when index data is inputted on the document list.

Furthermore, if an identical index is inputted in a plurality of rows on the document list, an identical value is inputted in a plurality of rows in a key field on the document list and single index data is created for a single key on the index data table. This makes it possible to reduce a memory amount.

What is claimed is:

1. A file management apparatus comprising:
   index data list display control means for controlling displaying of an index data list for managing a plurality of files, wherein the index data list includes index data which is data comprising a plurality of fields;
   selection means for selecting index data selected from data except data in the index data list;
   judgment means, in the case of pasting of index data selected by the selection means, for judging whether index data can be pasted or not onto the list; and
   paste means, in the case that the judgment means judging that the index data can be pasted, for pasting the index data onto the list.

2. A file management apparatus according to claim 1, wherein the selection means selects locations of the index data to be pasted,
   and wherein said judging by the judgment means is performed based on row numbers and column numbers of index data at said selected locations.

3. A file management apparatus according to claim 2, wherein said judging by the judgment means is performed based on attributions of index data at said selected locations.

4. A file management apparatus according to claim 2, wherein the index data to be pasted is generated by executing a spread sheet program or a text editor program.

5. A file management apparatus according to claim 1, wherein the file management apparatus processes pre-index files or post-index files.

6. A file management method comprising:
   index data list display control step, of controlling display of an index data list for managing a plurality of files, wherein the index data list includes index data which is data comprising a plurality of fields;
   a selection step, of selecting index data selected from data except data in the index data list;
   a judgment step, in the case of pasting of index data selected in the selection step, of judging whether index data can be pasted or not onto the list; and
   a paste step, in the case that judging in the judgment step that the index data can be pasted, of pasting the index data onto the list.

7. A file management method according to claim 6, wherein locations of the index data to be pasted are selected in the selection step,
   and wherein said judging in the judgment step is performed based on row numbers and column numbers of index data at said selected locations.

8. A file management method according to claim 7, wherein said judging in the judgment step is performed based on attributions of index data at said selected locations.

9. A file management method according to claim 7, wherein the index data to be pasted is generated by executing a spread sheet program or a text editor program.

10. A file management method according to claim 6, wherein the file management method processes pre-index files or post-index files.

11. A storage medium for storing a computer executable program for managing a file, the computer program comprising:
    index data code to control displaying of index data for managing a plurality of files, wherein the index data list includes index data which is data comprising a plurality of fields;
    code to select index data selected from data except data in the index data list;
    code to judge, responsive to a designation in the case of pasting of selected index data, whether index data can be pasted or not onto the list; and
    code to paste, in the case that the index data can be pasted, the index data onto the list.

12. A storage medium for storing a computer executable program according to claim 11, wherein said code to select also selects locations of the index data to be pasted,
    and wherein said judgment is performed based on row numbers and column numbers of index data at said selected locations.

13. A storage medium for storing a computer executable program according to claim 12, wherein said judgment is performed based on attributions of index data at said selected locations.

14. A storage medium for storing a computer executable program according to claim 12, wherein the index data to be pasted is generated by executing a spread sheet program or a text editor program.

15. A storage medium for storing a computer executable program according to claim 11, wherein the computer program processes pre-index files or post-index files.

* * * * *